(12) United States Patent
Chen et al.

(10) Patent No.: US 11,474,623 B1
(45) Date of Patent: Oct. 18, 2022

(54) STYLUS PENS WITH BATTERIES

(71) Applicant: Hewlett-Packard Development Company, L.P., Spring, TX (US)

(72) Inventors: Tai Hsiang Chen, Taipei (TW); Wei Hung Lin, Taipei (TW); Hung Sung Pan, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/345,008

(22) Filed: Jun. 11, 2021

(51) Int. Cl.
*G06F 3/0354* (2013.01)
*G06F 3/02* (2006.01)
*H02J 7/34* (2006.01)
*G06F 3/038* (2013.01)

(52) U.S. Cl.
CPC ............ *G06F 3/03545* (2013.01); *G06F 3/02* (2013.01); *G06F 3/0383* (2013.01); *H02J 7/342* (2020.01); *G06F 2203/0384* (2013.01)

(58) Field of Classification Search
CPC ............................. G06F 3/03545; H02J 7/342
See application file for complete search history.

(56) References Cited

U.S. PATENT DOCUMENTS

| | | | |
|---|---|---|---|
| 6,577,299 B1 | 6/2003 | Schiller | |
| 10,248,652 B1 * | 4/2019 | Venkataraman | ..... G06V 30/228 |
| 2007/0268278 A1 * | 11/2007 | Paratore | ............. G06F 3/03545 |
| | | | 345/179 |
| 2008/0134101 A1 * | 6/2008 | Newman | ............. G06F 3/03545 |
| | | | 715/856 |
| 2009/0109177 A1 * | 4/2009 | Zloter | ................. G06F 3/03545 |
| | | | 345/163 |
| 2012/0194484 A1 | 8/2012 | Lehman | |
| 2013/0194242 A1 | 8/2013 | Park | |
| 2018/0364820 A1 * | 12/2018 | Wong | ..................... G06F 3/0442 |
| 2019/0384418 A1 | 12/2019 | Kim | |
| 2021/0041984 A1 * | 2/2021 | Yuan | ........................ H02M 3/07 |
| 2021/0373679 A1 * | 12/2021 | Shin | ......................... H01Q 9/26 |

* cited by examiner

*Primary Examiner* — Chun-Nan Lin
(74) *Attorney, Agent, or Firm* — HPI Patent Department

(57) ABSTRACT

An example stylus pen may include a main body including a first battery and a writing tip attached to the main body. Further, the stylus pen may include a cap removably disposed on the main body to cover the writing tip. The cap may include a second battery. Furthermore, the stylus pen may include a controller to charge the first battery from the second battery.

9 Claims, 7 Drawing Sheets

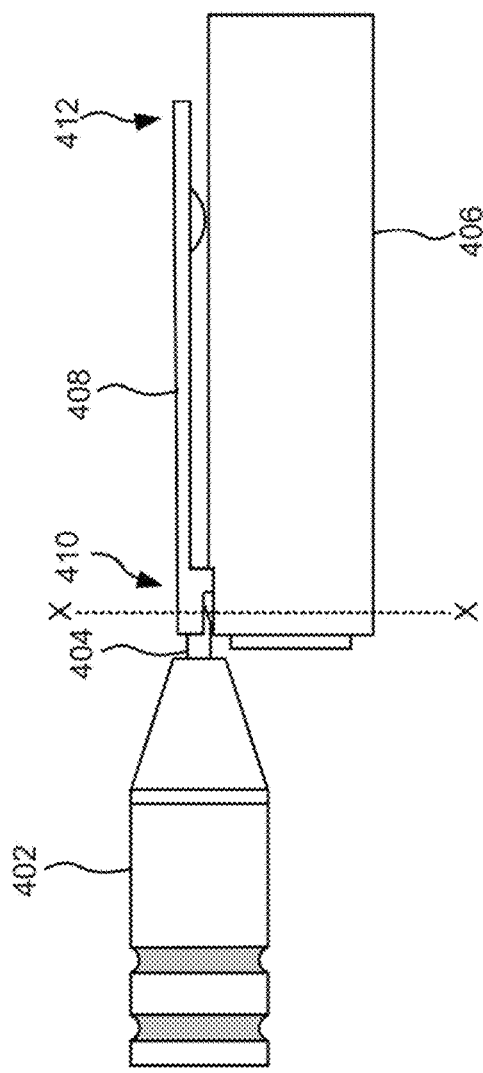
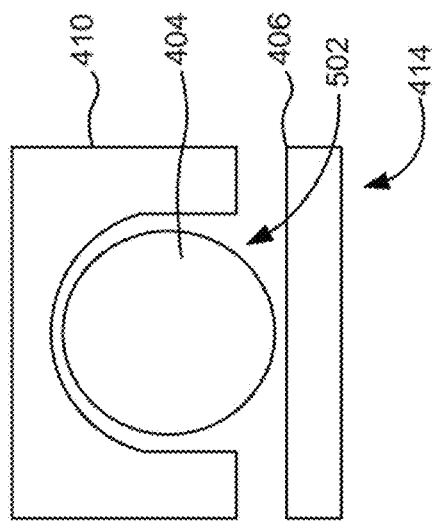
FIG. 5A
FIG. 5B
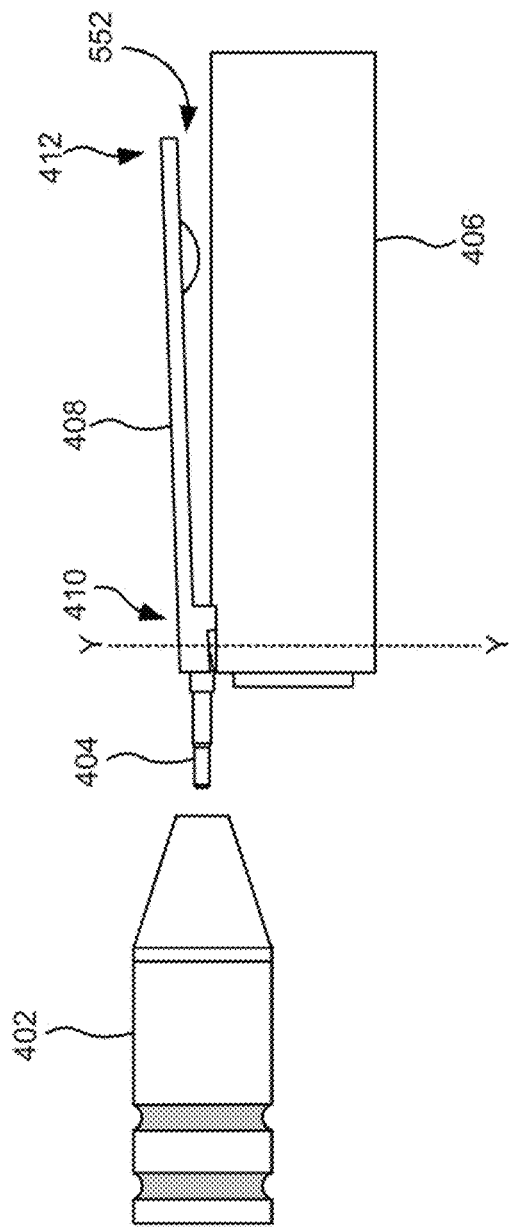
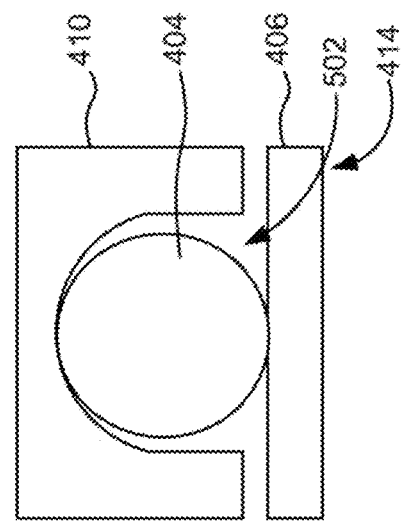
FIG. 5C
FIG. 5D

STYLUS PENS WITH BATTERIES

BACKGROUND

A stylus pen may be used as an input device for an electronic device that has a touchscreen. In this manner, the stylus pen may be used to interact with the touchscreen for purposes of inputting commands, selecting options presented on a graphical user interface (GUI), scrolling within a window of the GUI, drawing images, and so forth. The stylus pen may be a passive stylus pen, which does not include electronic components. The passive stylus pen may provide an input to the electronic device by physically contacting the touchscreen. The stylus pen may be an active stylus pen that includes electronic components. The active stylus pen may allow an input to be communicated to the electronic device wirelessly (e.g., via Bluetooth) without the stylus pen physically contacting the touchscreen. Such stylus pens may include a writing tip and a hollow cap detachably attached to the stylus pens to protect the writing tip from damage.

BRIEF DESCRIPTION OF THE DRAWINGS

Examples are described in the following detailed description and in reference to the drawings, in which:

FIGS. 5A to 5D show schematic views of the example stylus pen of FIG. 4, depicting a mechanism of the writing tip removable portion to remove the writing tip;

DETAILED DESCRIPTION

Figure 1A:
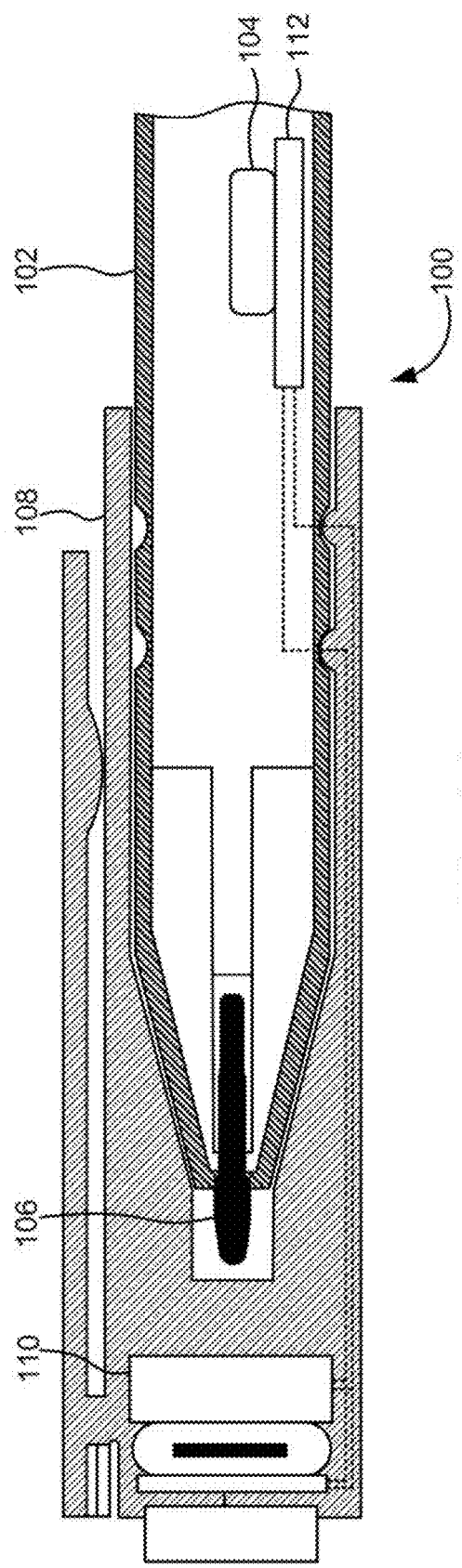
FIG. 1A is a schematic cross-sectional view of an example stylus pen, depicting a cap including a second battery to charge a first battery in a main body.

Electronic devices, such as tablets, smart phones, laptops, and the like, are increasingly being used in connection with a stylus pen as an input modality. The stylus pen may be used to interact with a user interface of an electronic device. Some example interactions by the stylus pen may include entering text, making selections, or providing input to a touchscreen. Further, with a writing tip at an end of the stylus pen, the stylus pen can be used as a digital pen to provide a user with handwriting experience. Such stylus pens may be provided with a cap (e.g., which can be detachably attached to the stylus pen) to cover the writing tip and to protect the writing tip from damage when the stylus pen is not in use. The cap may also restrict the user from accidental touching of the writing tip, which can result in an unintentional wakeup of the stylus pen from a sleep mode.

With increasing applications of the stylus pen, the stylus pen may include multiple electronic components such as sensors (e.g., an actuator, a force sensor, an accelerometer sensor, a gyro sensor, and the like) and other components (e.g., an active stylus controller, an audio component, and the like) to support such applications. To enable these and other interactions, the electronic components may require power. Further, a battery used to power the electronic components may have a limited time during which the battery can provide power to the stylus pen to support various interactions. Therefore, the usage of stylus pen may run down the battery and impact a user experience.

Further, the stylus pen may be provided with a top button at a tail end to perform various functions such as to open sticky notes, to open a screen sketch, to enable Bluetooth, to open or control an application, and the like. However, when the cap is mounted at the tail end of the stylus pen, the user may not be able to access the top button.

Examples described herein may provide a stylus pen including a main body, a writing tip attached to the main body, and a cap removably mounted on the main body to cover the writing tip. Further, the main body may include a first battery and the cap may include a second battery. Furthermore, the stylus pen may include a controller to charge the first battery from the second battery when the cap is mounted on the main body. In this example, the cap may act as a power bank to charge the stylus pen.

In another example, the stylus pen may include a first electrical interface disposed at a tail end of the main body. Further, the cap may include a second electrical interface to electrically connect to the first electrical interface when the cap is mounted at the tail end. Furthermore, the cap may include a user-activatable button at a top end. When the cap is mounted at the tail end, the user-activatable button may be used to trigger a wireless function of the stylus pen via the electrical connection. Thus, the user-activatable button on the cap may be used to perform the functions of the top button of the stylus pen when the cap is mounted at the tail end of the stylus pen.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1A is a schematic cross-sectional view of an example stylus pen 100, depicting a cap 108 including a second battery 110 to charge a first battery 104 in a main body 102. Example stylus pen 100 may be an electronic pen that can provide input to an electronic device when stylus pen 100 is within a vicinity of the electronic device (e.g., via hovering above a touch-sensitive surface of the electronic device) or when stylus pen 100 contacts the electronic device. An example electronic device may include a game console, a desktop computer, a laptop computer, a smartphone, a personal digital assistant (PDA), a satellite navigation device, a camera, a global positioning system (GPS) unit, an interactive display in automobiles or appliances, or any touchscreen-enabled electronic device.

As shown in FIG. 1A, stylus pen 100 may include main body 102. In an example, main body 102 may be of a cylindrical shape or any other shape such as a pen, pencil, marker, or the like to fit ergonomically in the user's hand. Further, main body 102 may include first battery 104. Example first battery 104 may be a rechargeable battery such as a lithium-ion battery, a nickel-cadmium battery, a gel-cell battery, a metal-hydride battery, or the like.

Further, stylus pen 100 may include a writing tip 106 attached to main body 102. Example writing tip 106 may include a rounded tip of a material suitable for contact with a touchscreen of the electronic device. An example material of writing tip 106 may include a flexible material such as a conductive rubber-based material, a conductive silicone-based material, a conductive polymeric fiber-based material, or the like. Further, writing tip 106 may be secured to main body 102 via a fastening mechanism such as a press fit, a force fit, a screw, a snap fit, glue or adhesive, Velcro®, a magnet, tape, or any other fastening mechanism.

Furthermore, stylus pen 100 may include cap 108 removably disposed on main body 102 to cover writing tip 106. Further, cap 108 may include second battery 110. Furthermore, stylus pen 100 may include controller 112. In an example, controller 112 may be disposed in main body 102 as shown in FIG. 1A. In another example, controller 112 may also be disposed in cap 108. Example controller 112 may be implemented in hardware, machine-readable instructions, or a combination thereof. For example, controller 112 may be implemented as engines or modules including any combination of hardware and programming to implement the functionalities described herein. For example, controller 112 can be implemented with a respective microcontroller, an application-specific integrated circuit (ASIC), a field programmable gate array (FPGA), or the like.

During operation, controller 112 may charge first battery 104 from second battery 110, for instance, when cap 108 is disposed on main body 102. In an example, cap 108 may be disposed at a front end of main body 102 to cover writing tip 106 when stylus pen 100 is not in use. In another example, cap 108 may be disposed on a tail end of main body 102 when stylus pen 100 is in use. In both the scenarios, i.e., when cap 108 is disposed at the front end or at the tail end, first battery 104 may be charged from second battery 110.

In an example, controller 112 may wirelessly charge first battery 104 from second battery 110. An example wireless charging may conform to a wireless charging standard such as Qi, Powermat, A4WP, near-field communication (NFC), or the like. In another example, controller 112 may charge first battery 104 from second battery 110 via an electrical connection between cap 108 and main body 102. An example charging of first battery 104 from second battery 110 via the electrical connection is described in FIG. 2.

Figure 1B:
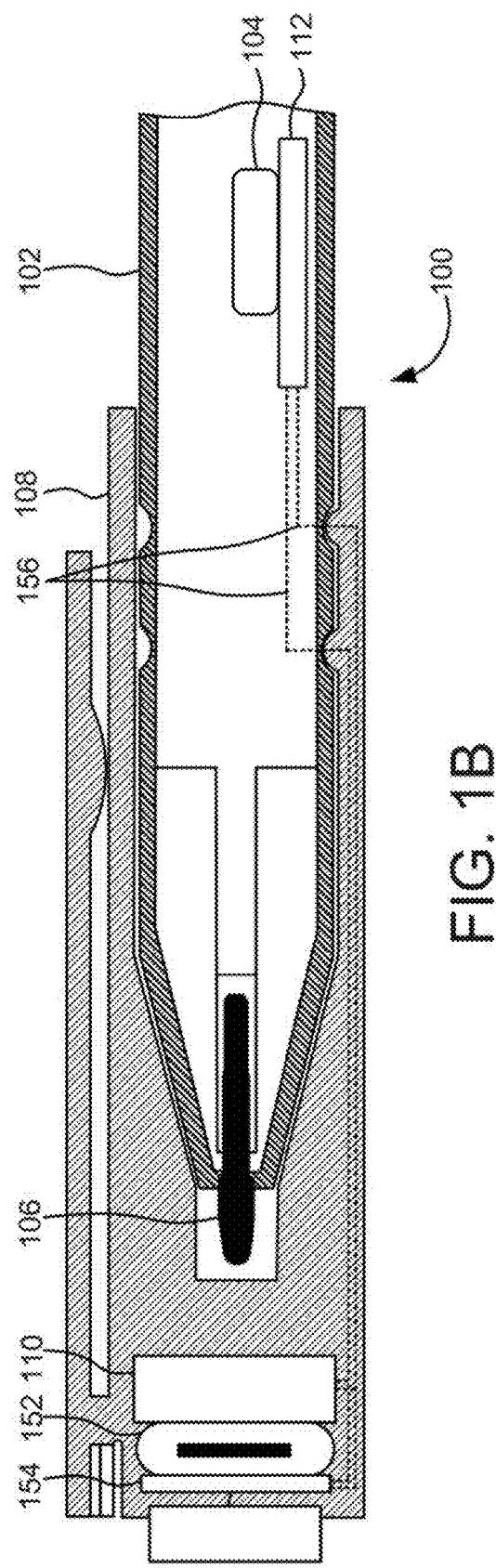
FIG. 1B is a schematic cross-sectional view of the example stylus pen of FIG. 1A, depicting additional features.

FIG. 1B is a schematic cross-sectional view of example stylus pen 100 of FIG. 1A, depicting additional features. For example, similarly named elements of FIG. 1B may be similar in structure and/or function to elements described with respect to FIG. 1A. As shown in FIG. 1B, cap 108 may include a charging interface 152 to charge second battery 110 from an external power source. Example charging interface 152 may include a universal serial bus (USB) interface, a Lightning™ interface, or the like. An example USB interface may include a USB-A interface, USB-B interface, USB-C interface, mini-USB interface, micro-USB interface, or the like.

Further, cap 108 may include a controller 154 (e.g., a charging circuit) connected to charging interface 152 and second battery 110. In an example, when the external power source is disconnected from charging interface 152 and when cap 108 is mounted on main body 102, controller 154 may charge first battery 104 from second battery 110. In this example, the functions of controller 154 may also be implemented using controller 112 disposed in main body 102.

In another example, when the external power source is connected to charging interface 152 and when cap 108 is detached from main body 102, controller 154 may charge second battery 110 from the external power source. In yet another example, when the external power source is connected to charging interface 152 and when cap 108 is mounted on main body 102, controller 154 may charge first battery 104, second battery 110, or a combination thereof from the external power source. In this example, controller 154 may charge first battery 104, second battery 110, or both depending on a state of charge of first battery 104 and second battery 110. As shown in FIG. 1B, first battery 104 may be charged via an electrical connection 156 (e.g., as shown in dotted lines) formed between cap 108 and main body 102.

Figure 2:
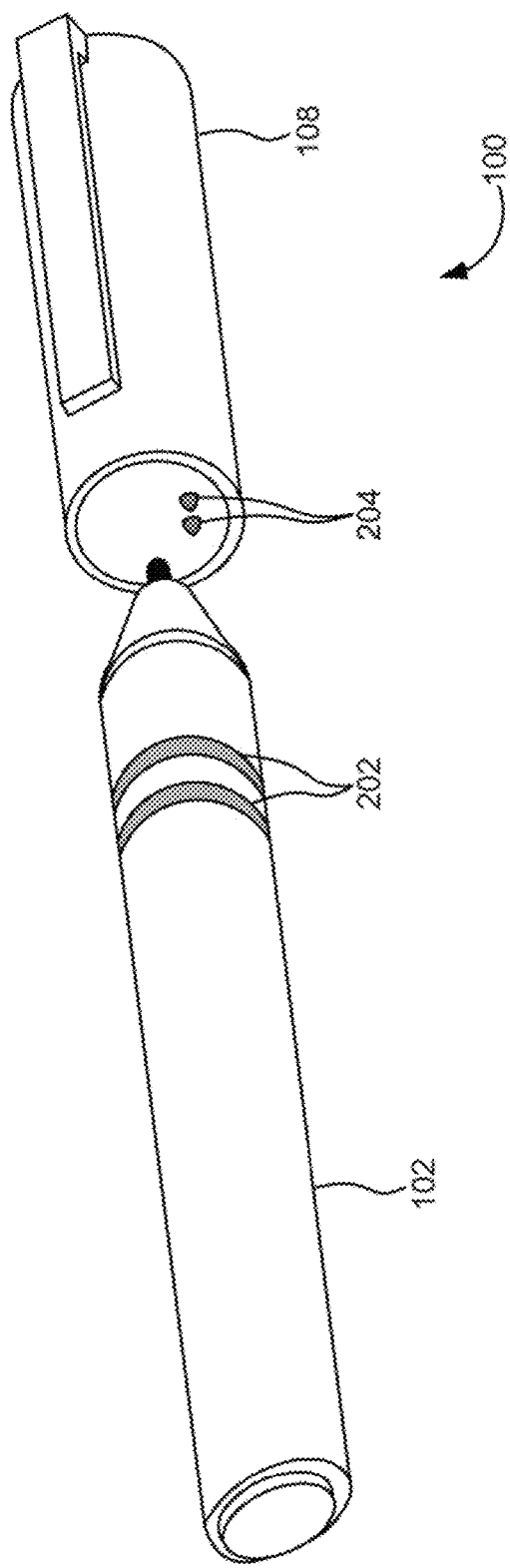
FIG. 2 is a perspective view of the example stylus pen of FIG. 1A, depicting electrical interfaces to charge the first battery from the second battery.

FIG. 2 is a perspective view of example stylus pen 100 of FIGS. 1A and 1B, depicting electrical interfaces to charge first battery 104 (e.g., as shown in FIGS. 1A and 1B) from second battery 110 (e.g., as shown in FIGS. 1A and 1B). For example, similarly named elements of FIG. 2 may be similar in structure and/or function to elements described with respect to FIGS. 1A and 1B. As shown in FIG. 2, main body 102 may include a first electrical interface 202. Example first electrical interface 202 may include a pair of contact pads or mating pads. Further, cap 108 may include a second electrical interface 204. Example second electrical interface 204 may include a pair of contact pins (e.g., pogo pins or spring-loaded pins). When cap 108 is mounted on main body 102, the contact pins may contact the respective contact pads to form an electrical connection (e.g., as shown in dotted lines 156 in FIG. 1B).

In an example, controller 112 (e.g., as shown in FIGS. 1A and 1B) or controller 154 (e.g., as shown in FIG. 1B) may charge first battery 104 from second battery 110 via the electrical connection between first electrical interface 202 and second electrical interface 204. In another example, controller 154 or controller 112 may charge first battery 104 from the external power source via the electrical connection. For example, the electrical connection may enable supply of charging current from second battery 110 or the external power source to first battery 104 to charge first battery 104. Thus, cap 108 may act as a power bank to charge first battery 104 of stylus pen 100.

Figure 3A:
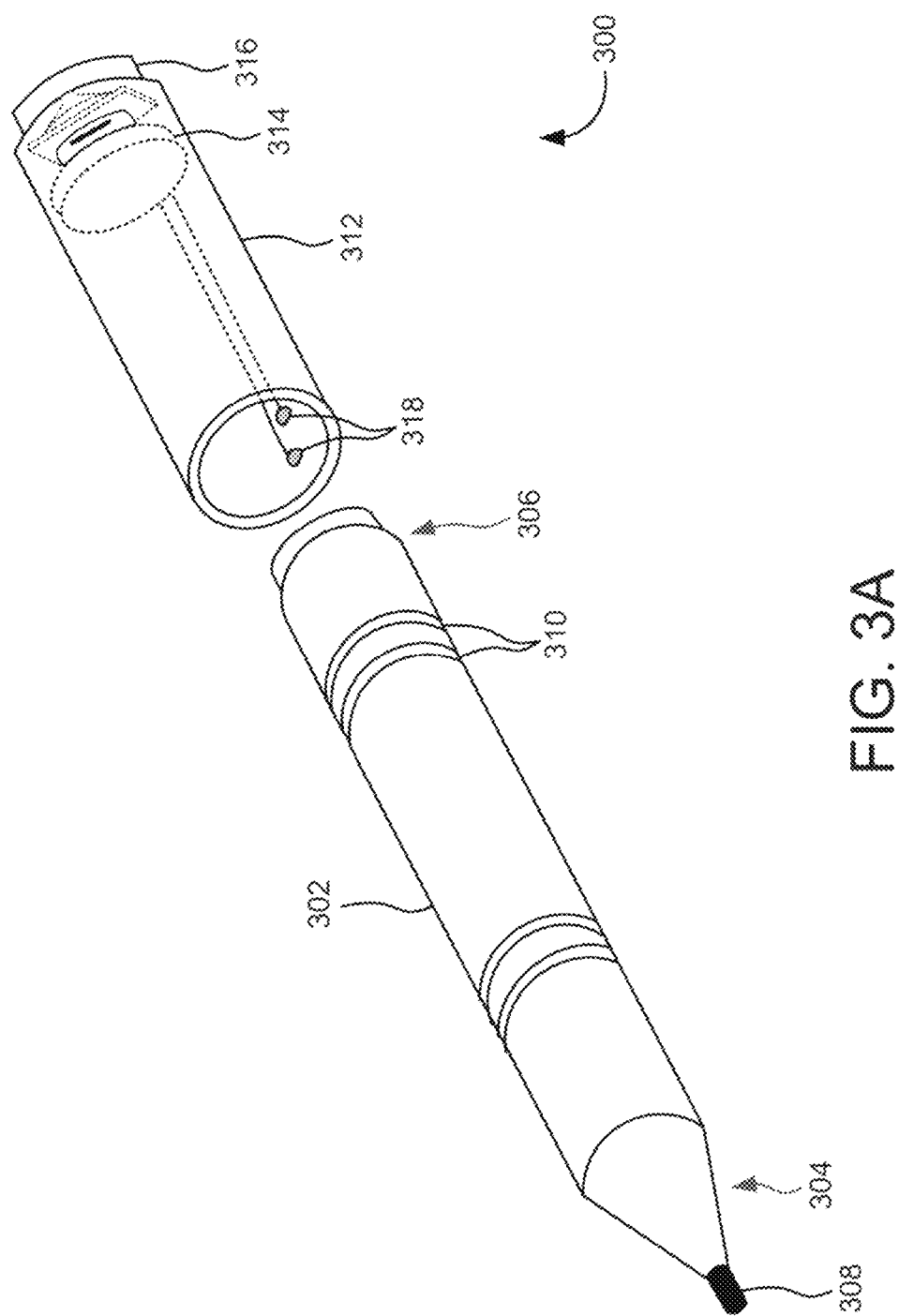
FIG. 3A is a perspective view of an example stylus pen, depicting a cap including a user-activatable button to trigger a wireless function associated with the stylus pen.

FIG. 3A is a perspective view of an example stylus pen 300, depicting a cap 312 including a user-activatable button 316 to trigger a wireless function associated with stylus pen 300. As shown in FIG. 3A, stylus pen 300 may include a main body 302 having a first end 304 and a second end 306. Further, stylus pen 300 may include a writing tip 308 attached to main body 302 at first end 304. Furthermore, stylus pen 300 may include a first electrical interface 310 disposed on main body 302 at second end 306. Example first electrical interface 310 may include a pair of contact pads or mating pads.

Further, stylus pen 300 may include cap 312 to removably mount on main body 302. In an example, cap 312 may include a first battery 314 and user-activatable button 316 connected to first battery 314. Further, cap 312 may include a second electrical interface 318 to electrically connect to first electrical interface 310 when cap 312 is mounted on second end 306. Example second electrical interface 318 may include a pair of contact pins. In an example, user-activatable button 316, when activated, may trigger a wireless function associated with main body 302 via the electrical connection. User-activatable button 316 may be used to perform various wireless functions associated with stylus pen 300 depending on a number of times or a duration of time user-activatable button 316 is pressed. For example, sticky notes may be opened on a graphical user interface of an electronic device when user-activatable button 316 is pressed once, a screen sketch application may be opened on the graphical user interface when user-activatable button 316 is double-clicked, and so on. The wireless functions associated with user-activatable button 316 may be configurable.

Figure 3B:
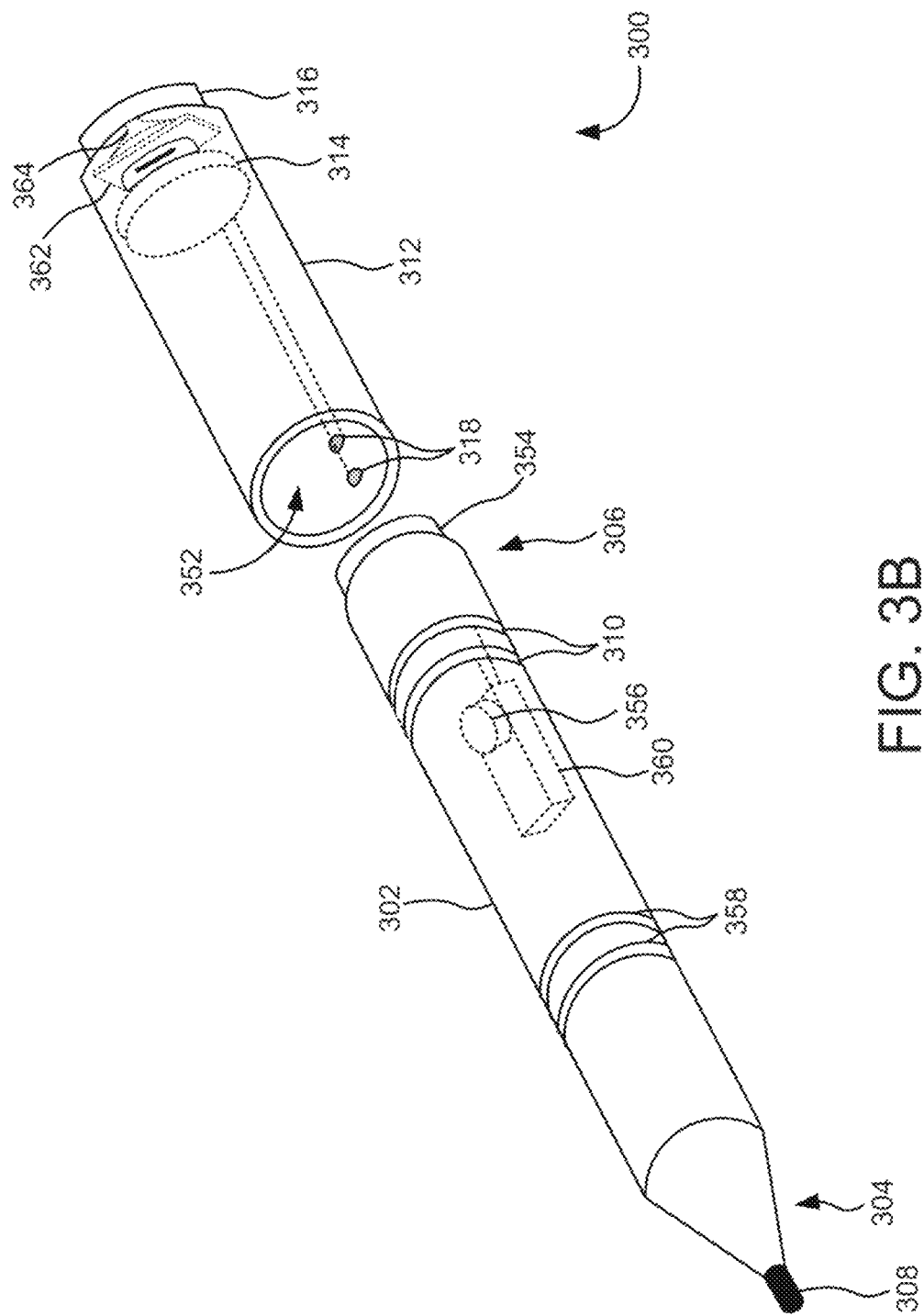
FIG. 3B is a perspective view of the example stylus pen of FIG. 3A, depicting additional features.

FIG. 3B is a perspective view of example stylus pen 300 of FIG. 3A, depicting additional features. For example, similarly named elements of FIG. 3B may be similar in structure and/or function to elements described with respect to FIG. 3A. As shown in FIG. 3B, stylus pen 300 may include a second battery 356 disposed in main body 302. Further, stylus pen 300 may include a third electrical interface 358 disposed on main body 302 at first end 304. Furthermore, cap 312 may include an inner cavity with an opening 352 at a first end of cap 312 to receive first end 304 or second end 306 of main body 302.

In an example, when cap 312 is mounted on first end 304, third electrical interface 358 may electrically connect to second electrical interface 318 to charge second battery 356 from first battery 314. For example, when cap 312 receives first end 304 (e.g., as shown in FIG. 1A) via opening 352, second battery 356 may be charged from first battery 314 via the electrical connection between third electrical interface 358 and second electrical interface 318.

In another example, when cap 312 is mounted on second end 306 of main body 302, first electrical interface 310 may electrically connect to second electrical interface 318 to charge second battery 356 from first battery 314. For example, when cap 312 receives second end 306 (e.g., as shown in FIG. 3B) via opening 352, second battery 356 may be charged from first battery 314 via the electrical connection between first electrical interface 310 and second electrical interface 318.

In yet another example, when cap 312 is disposed at second end 306 of main body 302, user-activatable button 316 may be used to perform the wireless functions associated with stylus pen 300 via the electrical connection between first electrical interface 310 and second electrical interface 318. In other examples, main body 302 may include a top button 354 at second end 306 to perform the wireless functions associated with stylus pen 300. However, when cap 312 is mounted at second end 306, the user may not be able to access top button 354. In this example, user-activatable button 316 disposed at a second end of cap 312 may be used to perform the wireless functions associated with stylus pen 300.

As shown in FIG. 3B, cap 312 may include a controller 362 and a switch 364 connected to user-activatable button 316. In this example, controller 362 may detect a number of times or a duration of time user-activatable button 316 is pressed via switch 364 and generate an input signal based on the number of times or the duration of time user-activatable button 316 is pressed. Further, main body 302 may include a controller 360 to receive the input signal from user-activatable button 316 via the electrical connection. Furthermore, controller 360 may perform the wireless function corresponding to the input signal. In other examples, controller 360 in main body 302 may detect the number of times user-activatable button 316 is pressed via the electrical connection and perform the wireless function accordingly.

Figure 4:
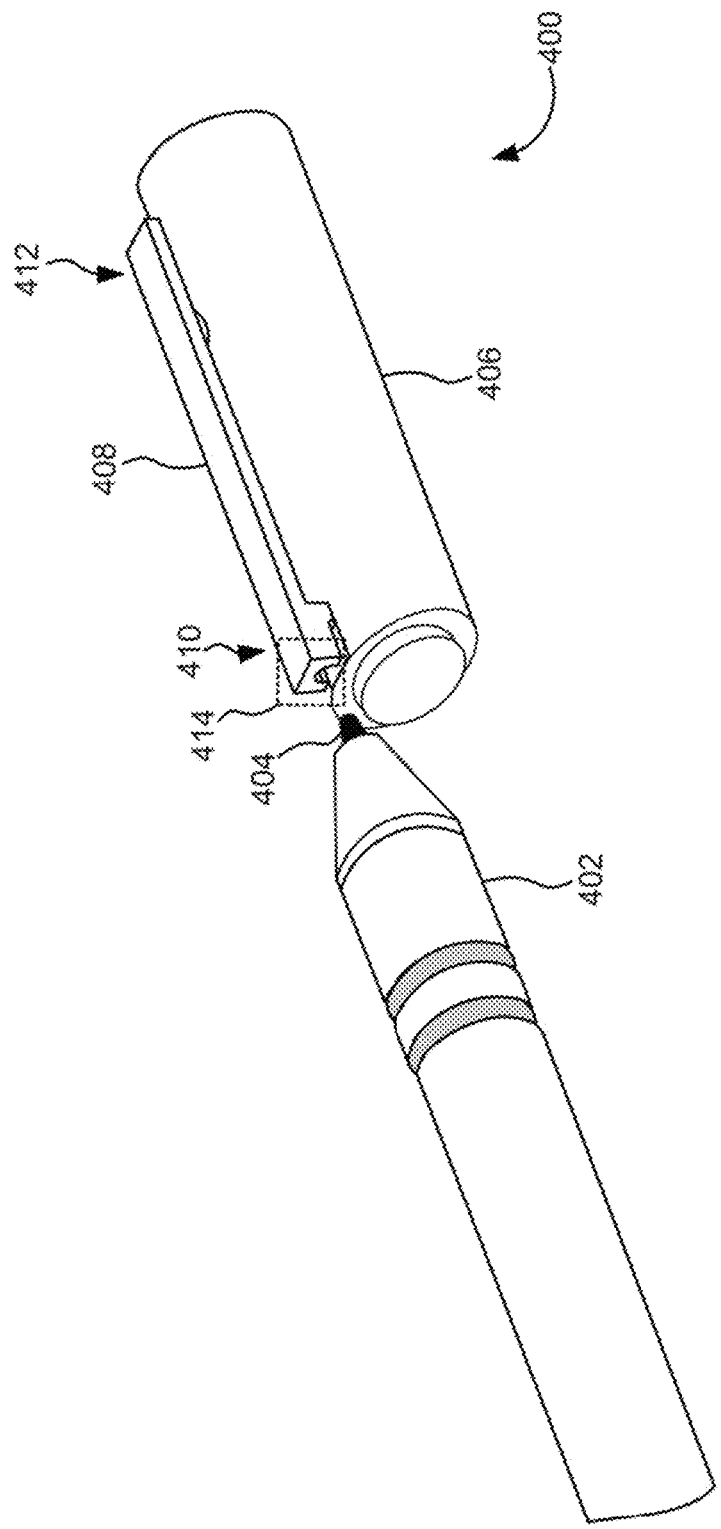
FIG. 4 is a perspective view of an example stylus pen, depicting a cap including a writing tip removable portion to remove a writing tip.

FIG. 4 is a perspective view of an example stylus pen 400, depicting a cap 406 including a writing tip removable portion 414 to remove a writing tip 404. As shown in FIG. 4, stylus pen 400 may include a main body 402 and writing tip 404 removably attached to main body 402. For example, writing tip 404 may be attached to main body 402 using a fastening mechanism such as a press fit. A fastening mechanism may include, for example, a male portion secured to main body 402 and a female portion associated with writing tip 404. Further, the male and female portions may have complimentary shapes so they may fasten securely to each other. Further, writing tip 404 may be removable and replaceable so a user can use main body 402 with a different writing tip. The replaceable writing tip may be useful, for instance, in an event when writing tip 404 wears out from use, becomes damaged, or if the user prefers a new writing tip.

As shown in FIG. 4, stylus pen 400 may include cap 406 to removably mount on main body 402 to cover writing tip 404. Further, cap 406 may include an elastic clip 408. In an example, elastic clip 408 may attach cap 406 to an edge of an external object. For example, elastic clip 408 may attach cap 406 to a sheet, such as a cover of an electronic device. In another example, elastic clip 408 may attach cap 406 to clothing, such as a shirt pocket or the like. Further, elastic clip 408 may protect stylus pen 400. For example, when stylus pen 400 having a cylindrical body and a cylindrical cap 406 is placed on a sloped surface, elastic clip 408 may prevent stylus pen 400 from rolling down the slope to prevent loss or breakage.

Further, elastic clip 408 may include a first end 410 to attach to cap 406. Furthermore, elastic clip 408 may include a second end 412 elastically movable relative to cap 406. Further, elastic clip 408 may include a writing tip removable portion 414 at first end 410 of elastic clip 408 to facilitate removal of writing tip 404 from main body 402. An example mechanism of writing tip removable portion 414 is described in FIGS. 5A to 5D.

FIGS. 5A to 5D show schematic views of example stylus pen 400 of FIG. 4, depicting a mechanism of writing tip removable portion 414 to remove writing tip 404. For example, similarly named elements of FIGS. 5A to 5D may be similar in structure and/or function to elements described with respect to FIG. 4. As shown in FIG. 5A, elastic clip 408 may include an elongated lever portion that extends from first end 410 (i.e., point of attachment to cap 406) along an axis of length of cap 406 and terminates at second end 412 of elastic clip 408. In some examples, elastic clip 408 may work though a lever action such that when second end 412 of elastic clip 408 is pulled in a direction perpendicular to a surface of cap 406, the lever action may create a spring force tending to pull second end 412 back towards the surface of cap 406.

Further, elastic clip 408 may include writing tip removable portion 414. In an example, writing tip removable portion 414 may clamp writing tip 404 via an opening 502 (e.g., as shown in FIG. 5B) when second end 412 is tilted in a direction perpendicular to the outer surface of cap 406. Further, writing tip removable portion 414 may facilitate removal of writing tip 404 from main body 402 upon the clamping of writing tip 404. In the example as shown in FIG. 5A, writing tip 404 may be inserted into writing tip removable portion 414 of elastic clip 408 to detach writing tip 404 from main body 402 of stylus pen 400. FIG. 5B shows a cross-sectional view (i.e., X-X) of writing tip removable portion 414 of FIG. 5A. In the example shown in FIG. 5B, writing tip removable portion 414 may include opening 502 formed between first end 410 of elastic clip 408 and the outer surface of cap 406. In this example, writing tip 404 may be inserted into opening 502.

Upon inserting writing tip 404 into opening 502, a force may be applied to elastic clip 408 to tilt second end 412 upwards (e.g., as shown by 552) as shown in FIG. 5C. FIG. 5D depicts a cross-sectional view (e.g., Y-Y) of writing tip removable portion 414 when the second end 412 is tilted upwards. As shown in FIG. 5D, when second end 412 is tilted upwards, first end 410 of elastic clip 408 may be tilted downwards (i.e., in a direction towards the outer surface of cap 406) to clamp or secure writing tip 404 between first end 410 of elastic clip 408 and the outer surface of cap 406. Upon clamping writing tip 404, writing tip 404 may be pulled to detach writing tip 404 from main body 402 as shown in FIG. 5C. Thus, elastic clip 408 may facilitate to clamp writing tip 404 and to remove writing tip 404 from main body 402.

Figure 6A:
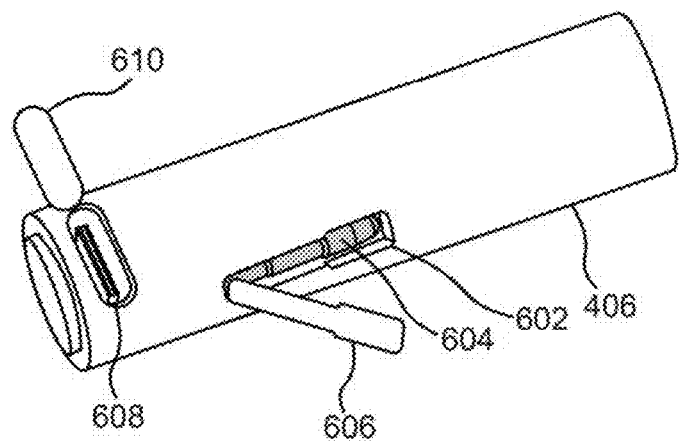
FIG. 6A is a perspective view of the example cap of FIG. 4, depicting a storage portion and a charging interface.

FIG. 6A is a perspective view of example cap 406 of FIG. 4, depicting a storage portion 602 and a charging interface 608. For example, similarly named elements of FIG. 6A may be similar in structure and/or function to elements described with respect to FIG. 4. In an example, cap 406 may include storage portion 602 to store a spare writing tip 604. Further, cap 406 may include a first cover portion 606 to removably cover storage portion 602. Thus, cap 406 may reserve a space for storing spare parts of stylus pen 400.

Figure 6B:
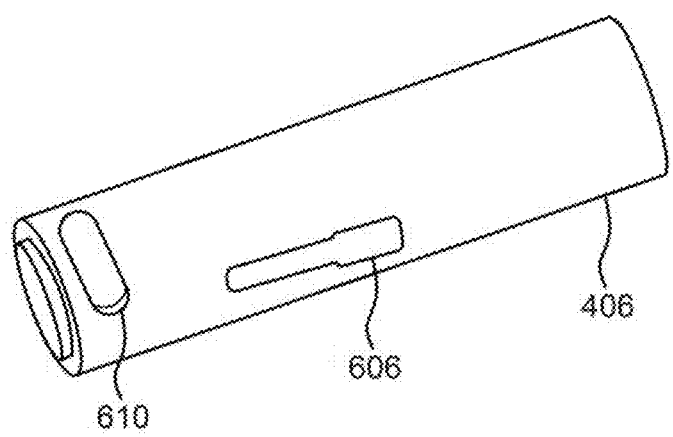
FIG. 6B is a perspective view of the example cap of FIG. 6A, depicting additional features.

In another example, cap 406 may include charging interface 608 (e.g., a charging interface 152 as shown in FIG. 1B). Further, cap 406 may include a second cover portion 610 to removably connect to charging interface 608 to cover charging interface 608. In the example shown in FIG. 6A, first cover portion 606 and second cover portion 610 are in an open position. FIG. 6B is a perspective view of example cap 406 of FIG. 6A, depicting first cover portion 606 and second cover portion 610 in a closed position to cover storage portion 602 and charging interface 608, respectively.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A stylus pen comprising:
    a main body including:
        a first electrical interface disposed on the main body at a second end of the main body;
        a third electrical interface disposed on the main body at a first end of the main body; and
        a first battery;
    a writing tip attached to the main body at the first end of the main body;
    a cap removably disposed on the main body to cover the writing tip while the cap is disposed on the first end of the main body, wherein the cap comprises:
        a second electrical interface; and
        a second battery; and
    a controller to:
        charge the first battery from the second battery via a first electrical connection between the first electrical interface and the second electrical interface while the cap is disposed on the second end of the main body; and
        charge the first battery from the second battery via a second electrical connection between the third electrical interface and the second electrical interface while the cap is disposed on the first end of the main body.

2. The stylus pen of claim 1, wherein the cap comprises: a charging interface to charge the second battery from an external power source.

3. The stylus pen of claim 2, wherein the charging interface comprises a universal serial bus (USB) interface.

4. The stylus pen of claim 2, wherein the controller is to:
    charge the first battery and the second battery from the external power source when the charging interface is connected to the external power source; and
    charge the first battery from the second battery when the charging interface is disconnected from the external power source.

5. The stylus pen of claim 1, wherein the controller is to wirelessly charge the first battery from the second battery.

6. The stylus pen of claim 1, wherein the first electrical interface comprises a pair of contact pads, and the second electrical interface comprises a pair of spring-loaded pins to contact the pair of contact pads while the cap is disposed on the second end of the main body.

7. The stylus pen of claim 1, wherein the cap comprises: a storage portion to store a spare writing tip.

8. The stylus pen of claim 1, wherein the cap comprises: a writing tip removable portion to remove the writing tip from the main body.

9. The stylus pen of claim 1, wherein the controller is disposed in the main body or the cap.

\* \* \* \* \*